June 18, 1963     E. T. CASEY     3,094,081
TORCH BODY ASSEMBLY FOR OXYGEN LANCING EQUIPMENT
Filed May 5, 1961     2 Sheets-Sheet 1
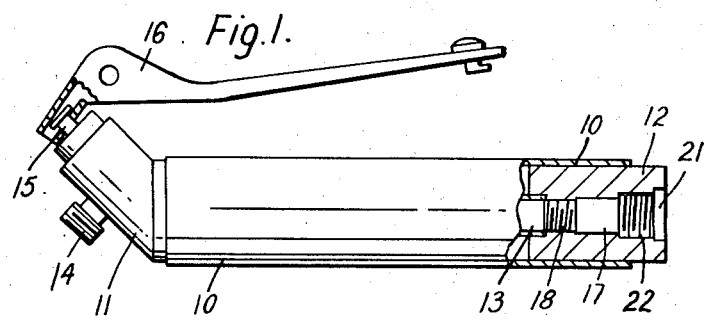
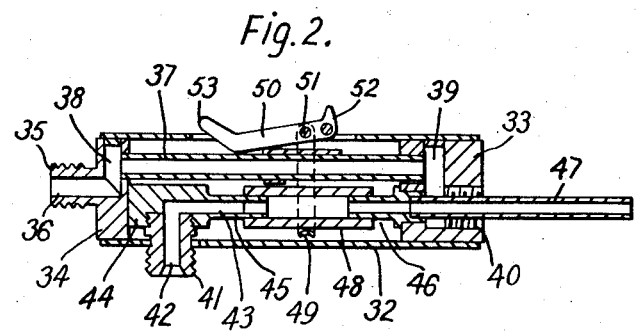
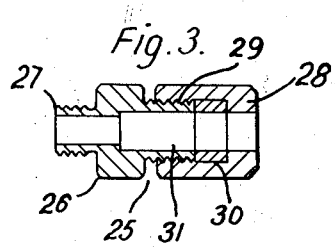
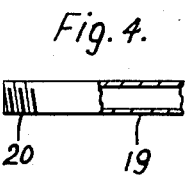
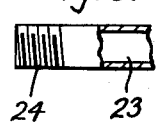
Inventor
EDWARD T. CASEY
By
Aaron R. Townshend
Attorney

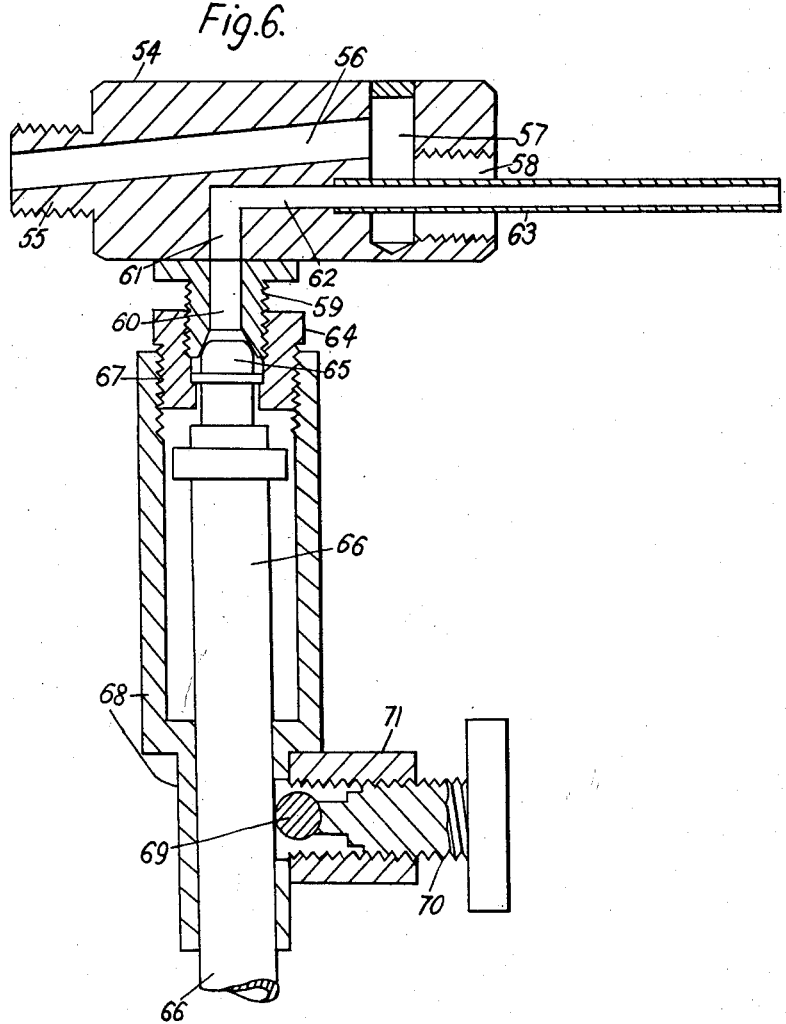

United States Patent Office 3,094,081
Patented June 18, 1963

3,094,081
TORCH BODY ASSEMBLY FOR OXYGEN
LANCING EQUIPMENT
Edward Thomas Casey, London, England, assignor to The
British Oxygen Company Limited, a British company
Filed May 5, 1961, Ser. No. 108,078
Claims priority, application Great Britain May 12, 1960
1 Claim. (Cl. 110—22)

This invention relates to a torch body assembly for oxygen lancing equipment employing consumable lances, and has for its object to provide an assembly which is usable selectively either for oxygen lancing or for oxygen lancing with the addition of powder to the oxygen stream, and in the latter use of the equipment including said assembly another object of the invention is to provide equipment which has a high safety factor for an operator in the event of accidental "back-fire" or "burn-back" while the equipment is in use.

According to the present invention, a torch body assembly for oxygen lancing equipment comprises a handle portion connectable to an oxygen supply line and having oxygen conduit means and a manually actuable oxygen flow-control valve, said handle portion being formed to detachably receive a lance member for the supply of oxygen to the bore thereof and also being formed to detachably receive an extension portion in lieu of the lance member, said extension portion having oxygen conduit means associated therewith for registering with the oxygen conduit means of the handle portion so as to form a continuation thereof through the extension portion and also being formed to detachably receive a lance member for the supply of oxygen to the bore thereof, said extension portion further being formed for connection to a powder supply line and having powder conduit means for the supply of powder to the bore of the lance, together with a manually actuable powder flow-control device associated with said powder conduit means.

An embodiment of the invention will now be described with reference to the accompanying drawings, in which:

FIG. 1 is a side elevation, partly in section, of the handle portion of a torch body assembly constructed according to the present invention.

FIG. 2 is a sectional side elevation of an extension portion of the torch body assembly.

FIG. 3 is a sectional side elevation of a chuck mechanism which can be fitted to either the handle portion of FIG. 1 or the extension portion of FIG. 2.

FIG. 4 is a fragmentary side elevation, partly in section, depicting the rear end of one consumable lance usable with the torch body assembly of FIGS. 1 to 3.

FIG. 5 is a similar view to FIG. 4 but shows another consumable lance of larger diameter than that shown in FIG. 4 which is also usable with the torch body assembly of FIGS. 1 and 2.

FIG. 6 is a sectional side elevation, on a larger scale than FIGS. 1–5, of an alternative extension portion to that shown in FIG. 2.

Referring to FIG. 1 of the drawings, the handle portion of a torch body assembly comprises a cylindrical outer wall part 10 which is secured at its rear end to a valve block 11 and at its forward end to a nose block 12. The blocks 11 and 12 between them support a central oxygen conduit 13, and the valve block 11 has an oxygen inlet fitting 14 to which the usual flexible oxygen supply line (not shown) can be attached. As its name implies, the valve block 11 incorporates an oxygen supply control valve, the stem of which can be seen at 15 and by means of which the flow of oxygen through the conduit 13 can be controlled, and the valve block 11 also mounts a pivotal hand lever 16 for depression by the operator to open said oxygen supply control valve, the valve being self-closing when the lever 16 is released.

The nose block 12 has a first bore 17, in alignment with the oxygen conduit 13, and the rearward end of the bore 17 is female screw-threaded at 18 to receive a consumable lance of which the rear end portion is shown in FIG. 4, said lance being a mild steel tube 19 having a male screw-thread 20 at the end which fits the female screw-thread 18 of the bore 17 of FIG. 1. This bore 17 is counterbored to larger diameter at 21, and said counterbore 21 is also female screw-threaded at 22 to receive the consumable lance of which the rear end portion is shown in FIG. 5, said lance being a mild steel tube 23 having a male screw-thread 24 at the end which fits the female screw-thread 22 of the counterbore 21 of FIG. 1. Thus, the handle portion of the torch body assembly of this invention is usable as a single unit with lances of two different sizes for lancing operations in which only oxygen gas is fed to the bore of the lance. In addition to being usable with the lances of FIGS. 4 and 5, which have the male screw-threads 23 and 24, the handle portion of FIG. 1 can receive the chuck unit 25 shown in FIG. 3 whereby a lance (not shown) of the same diameter as that shown in FIG. 4 but with a plain unthreaded end, can be fitted to the handle portion of FIG. 1. In FIG. 3 the chuck unit 25 comprises a cylindrical knurled body part 26 having a through axial bore and a screw-threaded axial projection 27 which fits the female thread 22 of the counterbore 21 of FIG. 1. An internally screw-threaded cylindrical nut 28 with a knurled periphery screws onto a second screw-threaded axial projection 29 of the chuck body 26, and the act of screwing the chuck nut 28 onto said projection 29 compresses a resilient insert 30, to deform the latter radially inwardly for gripping a plain lance inserted into the socket 31 which the bore or said chuck unit provides.

Referring now to FIG. 2 the extension portion illustrated comprises a cylindrical outer casing 32, to the respective ends of which are secured a nose block 33 and a rear block 34, the latter having an axially bored projection 35 formed with a male screw-thread which fits the female thread 22 of the counterbore 21 of the handle portion shown in FIG. 1 whereby the extension portion of FIG. 3 is detachably securable to the handle portion of FIG. 1 in lieu of a lance, with the bore 36 of the projection 35 in communication with the oxygen conduit 13 of the handle portion.

Extending between the nose block 33 and the rear block 34 is an oxygen conduit 37 which is offset laterally from the central longitudinal axis of the extension portion, the bore of the conduit 37 being joined with the bore 36 by a radial passage 38 in the rear block 34. Similarly, at the front end of the oxygen conduit 37 its bore joins with a radial passage 39 in the nose block 33, and an oxygen outlet through the nose block 33 is provided by an axially-directed female screw-threaded bore 40, which is also offset laterally from the central axis of the extension portion. The female screw-thread of the bore 40 is of size to receive either the male screw-thread 24 of the lance shown in FIG. 5 or the male screw-thread 27 of the chuck unit shown in FIG. 3.

Referring again to FIG. 2 a screw-threaded inlet fitting 41 to which a flexible powder supply conduit (not shown) can be attached extends laterally from the extension portion, and it will be seen that the bore 42 of said inlet fitting 41 joins an axially-disposed bore 43 in a powder inlet block 44, which is carried by the rear block 34, and to which the inlet fitting 41 is secured. The powder inlet block 44 has an integral forwardly-extending conduit projection or nipple member 45, and carried by the nose block 33 to be in alignment with said member 45 is a complementary rearwardly-extending conduit projection or nipple member 46, the latter having secured thereto a forwardly-extending powder injection tube 47, the bore of which forms a continuation of the bore of the nipple member 46. It will be noted that the powder injection tube 47 passes centrally through the oxygen outlet bore 40 in the nose block 33.

The two nipple members 45 and 46 are bridged by a length of flexible conduit 48, which completes the powder supply passage through this extension portion of the torch body assembly, and this flexible conduit, which may be of rubber material, tough plastic material or the like, can be squeezed and flattened to stop the flow of powder when desired. For this purpose a pinch-cock mechanism is provided, and comprises a stirrup member 49 which embraces the flexible conduit 48, and a cam lever 50 which is pivoted at 51 to the upper end of the stirrup member 49. The cam lever 50 operates through a slot in the cylindrical outer wall 32, and the nose portion 52 of the cam lever bears against the top side of the oxygen conduit 37 when the cam lever 50 is rotated, in clockwise direction in the drawing, by the operator lifting the tail 53 manually through 90° from the inoperative position shown. The stirrup member 49 is raised and causes the flexible conduit 48 to be squeezed flat against the underside of the oxygen conduit 37 to stop powder flow when the cam lever 50 is substantially vertical, and the lever is self-retaining in its vertical operative position.

Thus, when an oxygen-with-powder lancing operation has to be carried out, the operator screws the extension portion of FIG. 2 to the handle portion of FIG. 1 and can then either screw the large diameter lance of FIG. 5 into the screw-threaded bore 40 of the extension portion of FIG. 2 or can attach the chuck unit 25 of FIG. 3 thereto. With the chuck unit 25 thus employed, either the lance of FIG. 4 can be secured in the chuck unit, or a plain lance of the same diameter can be employed. The powder injection tube 47 extends well into the bore of any lance secured to the torch body assembly when assembled for powder lancing and the oxygen stream flows outside the tube 47 into the lance bore.

In FIG. 6 is shown an extension portion which is of alternative construction to that shown in FIG. 2 but which serves the same purpose in an oxygen-with-powder lancing operation. Referring to FIG. 6, the extension portion comprises a cylindrical member 54, the rearward end of which is formed with a concentric projection 55 having a male screw-thread which fits the female thread 22 of the counterbore 21 of the handle portion shown in FIG. 1 whereby the extension portion of FIG. 6 is detachably securable to the handle portion of FIG. 1 in lieu of a lance, with an oblique bore 56 in the member 54 in communication with the oxygen conduit 13 of the handle portion. The oblique bore 56 acts as an oxygen conduit, and opens forwardly into a radial passage 57 in the member 54, which in turn is in communication with an axially-directed female screw-threaded bore 58. The female screw thread of this oxygen outlet bore 58 is of size to receive either the male screw thread 24 of the lance shown in FIG. 5 or the male screw thread 27 of the chuck unit shown in FIG. 3.

Referring again to FIG. 6 a screw-threaded inlet fitting 59 extends laterally from the cylindrical member 54, and the bore 60 of said inlet fitting 59 joins a radial passage 61 in the member 54, the passage 61 in turn opening into an axially-disposed bore 62 which itself communicates with a co-axial and forwardly-extending powder injection tube 63 mounted in the member 54. It will be noted that the powder injection tube 63 passes centrally through the oxygen outlet bore 58.

Screwed onto the inlet fitting 59 is a connector nut 64, which is formed to retain a metallic nose nipple member 65 of a flexible powder supply conduit 66 and to force said nipple member 65 against the mouth of the inlet fitting 59, all as seen in FIG. 6. The connector nut 64 is externally screw-threaded at 67 to receive a cylindrical sleeve member 68 which encompasses and supports the end portion of the flexible powder supply conduit 66. The outermost end portion of said sleeve member 68 is of reduced internal and external diameter, so as to fit closely around the conduit 56, and it carries a pinch-cock valve assembly comprising a ball member 69, a manual actuating screw 70, and an internally screw-threaded cylindrical housing 71 for said assembly. Rotation of the actuating screw in appropriate direction causes the ball 69 to squeeze and flatten the flexible conduit 66, for control of the rate of powder flow through the conduit or to stop powder flow entirely.

The manner of use of the extension portion shown in FIG. 6 is similar to that already described with reference to the extension portion shown in FIG. 2.

When a burn-back or blow-back occurs accidentally during a powder lancing operation, it is usually the case that an explosion or intense heat occurs at the region of first contact between the powder stream and the oxygen stream. With torch body assemblies as hitherto constructed, it has been customary for this region to be within the handle portion of the torch body, the oxygen and powder supply conduits both being connected to the rear end of the torch body, with the result that the operator's hands have been prone to injury in the event of burn-back or blow-back.

The present invention provides a high factor of safety in this respect, since burn-back or blow-back is unlikely to travel rearwardly any further than the tip of the powder injection tube 47 of FIG. 2, or the tube 63 of FIG. 6, but even if it travelled further rearwardly to the powder inlet bores 42 or 61, it is still confined to the extension portions of FIG. 2 or of FIG. 6, while the handle portion of FIG. 1 is the part of the torch body assembly in the grip of the operator's hands.

It will be seen that the invention provides a torch body assembly which is more versatile in comparison with conventional apparatus, and which provides an improved safety factor in use for powder lancing.

What I claim is:

In a torch body assembly for oxygen lancing equipment, the combination of a handle portion, first attachment means on said handle portion for connection of an oxygen supply line thereto, oxygen conduit means in said handle portion, a manual flow control valve in said oxygen conduit means, second attachment means in said handle portion in the form of a pair of internally threaded bore portions of different diameter for selectively securing tubular lance members of corresponding diameters therein to receive oxygen from said oxygen conduit means, an extension portion, first attachment means on said extension portion detachably connectable with said second attachment means on the handle portion for securing the extension portion thereto in lieu of a lance member, oxygen conduit means in said extension portion for registering with said oxygen conduit means in the handle portion upon securing the handle and extension portions together, second attachment means on said extension portion communicating with said oxygen conduit, a lance member connected to said second attachment means on said extension to receive oxygen from said oxygen conduit means, third attachment means on said extension portion for connection of a powder supply thereto, powder conduit means in said extension portion and extending into the tubular lance for the supply of powder to the bore of the lance secured to said second attachment means, valve means operative to control the flow of powder through said powder conduit means, a lance-gripping chuck mechanism, first attachment means on said chuck mechanism selectively connectable with said second attachment means of said handle portion in lieu of a lance member or said extension portion and selectively connectable with said second attachment means of said extension portion in lieu of said lance member.

References Cited in the file of this patent

UNITED STATES PATENTS

| | | |
|---|---|---|
| 2,803,571 | Holub et al. | Aug. 20, 1957 |

FOREIGN PATENTS

| | | |
|---|---|---|
| 1,086,784 | France | Apr. 18, 1954 |
| 652,489 | Great Britain | Apr. 25, 1951 |
| 757,711 | Great Britain | Sept. 26, 1956 |